Nov. 10, 1953     N. BAROWSKY     2,658,415

CLAMPING DEVICE FOR IRREGULARLY SHAPED WORKPIECES

Filed April 13, 1951     2 Sheets-Sheet 1

INVENTOR.
NATHAN BAROWSKY
BY James P. Curtiss
ATTORNEY

Nov. 10, 1953  N. BAROWSKY  2,658,415
CLAMPING DEVICE FOR IRREGULARLY SHAPED WORKPIECES
Filed April 13, 1951  2 Sheets-Sheet 2

INVENTOR.
NATHAN BAROWSKY
BY
ATTORNEY

Patented Nov. 10, 1953

2,658,415

UNITED STATES PATENT OFFICE 2,658,415

CLAMPING DEVICE FOR IRREGULARLY SHAPED WORKPIECES

Nathan Barowsky, Holyoke, Mass., assignor to American Machinery Company, Willimansett, Mass.

Application April 13, 1951, Serial No. 220,921

4 Claims. (Cl. 81—33)

The present invention relates to improvements in clamping devices on the order of well known vises, and its principal object is to provide a vise which will positively grip an object of any regular or irregular shape.

Another object of the invention is to provide a vise which is quickly adjustable, so that it will accommodate objects of varying sizes and shapes, and having once conformed to the shape of the object will hold that conformation until readjusted.

The problem of holding irregular-shaped objects for machining operations, for inspection and for gauging, especially when complex angles or reference surfaces are involved, usually requires a number of clamps, shims, filler blocks, etc., and final adjustments which are tricky, to say the least. There are an infinite number of irregularly shaped parts, the surfaces of which when presented to the jaws of an ordinary vise, provide little, if any, possibility of securing a firm grip thereon because of the small surface contact of the jaws with the clamped object.

The present invention is intended to obviate the foregoing and other difficulties encountered when attempting to clamp irregularly-shaped objects or work-pieces, and contemplates the provision of self-seating, contour embracing jaws, each comprising a group of free floating, reciprocal segments for engaging the work-piece to confine and grip it rigidly. No work-piece is too eccentric, conical, round or irregular to be held by the jaws of the vise; and the advantage derived from a multi-point, uniform, positive pressure clamp on a tapered work-piece goes without saying.

A distinct advantage is derived from the vise of the present invention in view of the fact that almost all precision vises, without exception, lose accuracy as soon as clamping pressure is applied because the looseness of the jaws and a strong bending force can only produce a twisting clamp. On small work-pieces such distortion, however slight, may exceed allowed tolerances, and on larger work-pieces it may be impossible to hold them within allowed tolerances. With the present invention, the moving jaws retain their built-in accuracy because the clamping pressure of each individual jaw-segment is transmitted in a straight line to a rigid abutment, preferably a mass of steel balls confined in a chamber, the mass being displaceable up to a certain point and serving to take up the pressure and distribute the strains uniformly within the chamber and throughout the jaw segments.

The present invention provides a vise which is adaptable also for mounting work rapidly, as in production machining. Having once placed the jaw segments about a work-piece and clamped them thereon, all the usual haphazard replacement of like work-piece is eliminated. Subsequent work-pieces are merely inserted in the preformed cavity between the vise jaws and secured with approximately a quarter turn of a tightening screw.

In the accompanying drawings, a preferred form of the invention is shown by way of example and obviously many modifications and variations thereof may be made which will still be comprised within its spirit. It is to be understood, therefore, that the invention is not limited to any specific form or embodiment, except insofar as such limitations are specified in the appended claims.

Figure 1:
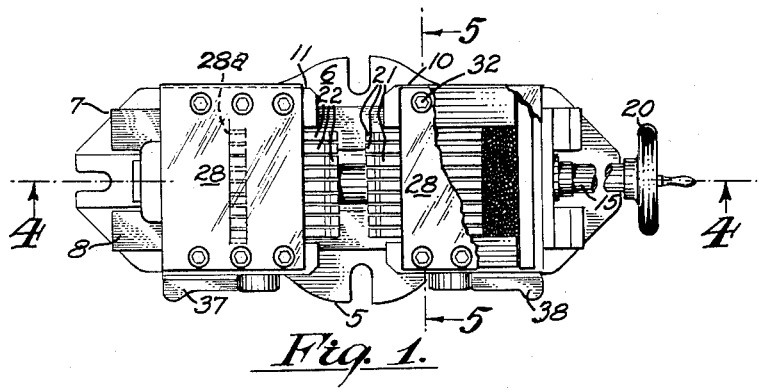
Fig. 1 is a plan view of the vise, partly broken away.
Figures 2, 3:
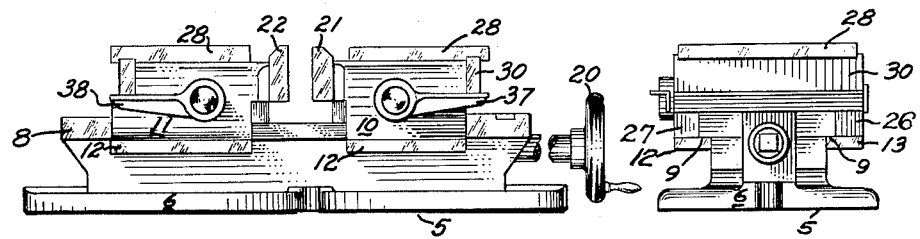
Fig. 2 is a side elevation of the same.
Fig. 3 is an end view, taken from the right-hand side of Fig. 2, the hand wheel being omitted.

According to the preferred embodiment of the invention, the vise 5 shown in the drawings includes a base 6. Rising from the base are ways 7 and 8 upon which are supported two opposed jaws 10 and 11 mounted in coacting relation for gripping a work-piece. The jaw 10 is fixed; whereas the jaw 11 is slidable over the ways 7 and 8, toward and away from the fixed jaw 10. Each of the ways 7 and 8 is formed with an undercut 9 and each jaw 10 and 11 is provided with a pair of longitudinal clamp bars 12 and 13 for holding the jaws to the ways, those associated with the jaw 11, however, permitting a sliding movement of the jaw on the ways 7 and 8. The jaw 11 is moved by means of a threaded member, indicated at 14 and including a screw shaft 15 rotatably mounted in the slidable jaw 11 and meshing with a threaded sleeve 16 fixedly depending from the jaw. The screw shaft 15 is held against endwise movement relative to the base 6 by retaining collars 17 and 18, fixed, respectively, on the left and right-hand extensions of the screw shaft through the left and right-hand end of the base 6. The right-hand end of the screw shaft extends beyond the collar 18 and a hand wheel 20, of sufficient size to permit considerable purchase to be applied in effecting a turning movement of the screw, is securely mounted on the extended portion of the screw shaft.

Figures 4, 5:
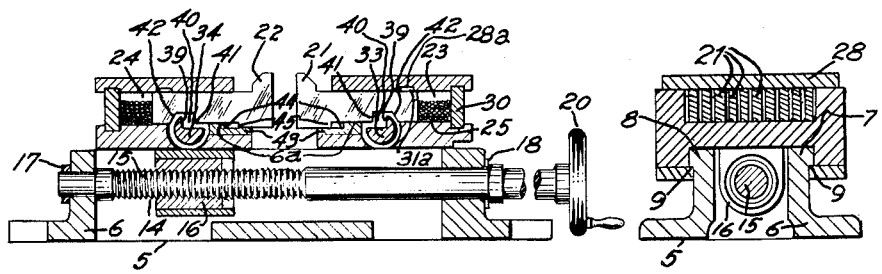
Fig. 4 is a vertical section, taken along line 4—4 of Fig. 1.
Fig. 5 is a transverse section, taken along line 5—5 of Fig. 1, looking in the direction of the arrows.
Figure 6:
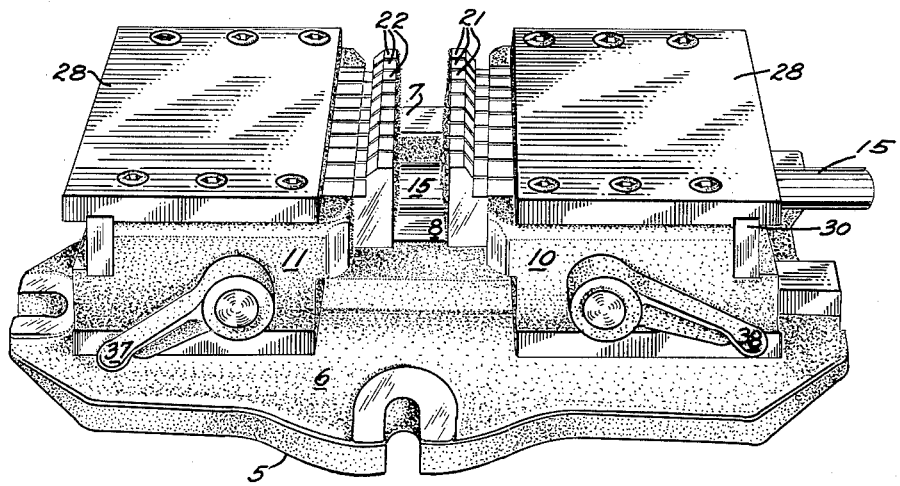
Fig. 6 is a perspective view of the vise.
Figure 7:
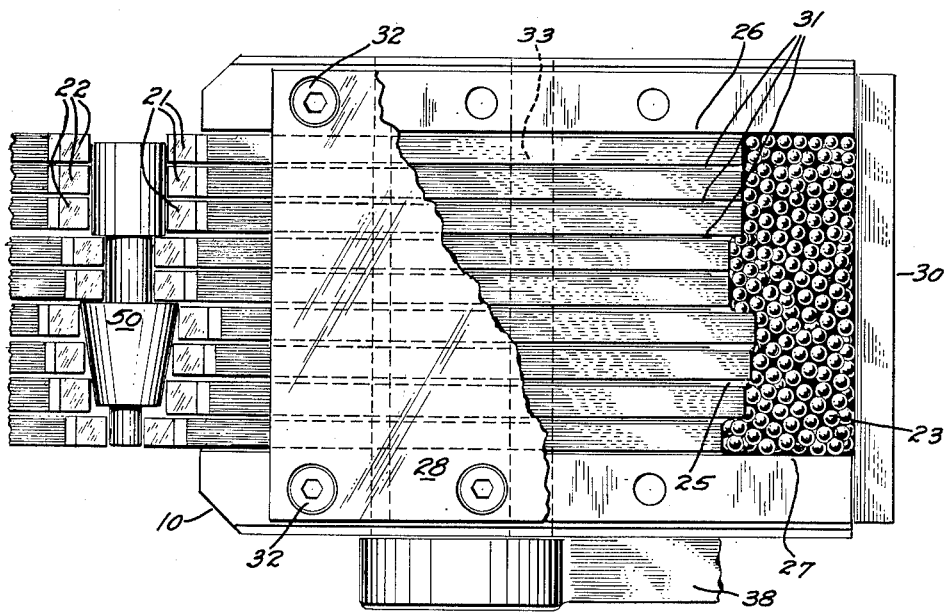
Fig. 7 is a detail view, partially broken away, of one of the vise jaws.

The jaws 10 and 11 present opposed, parallel faces which are formed each by a series of side-by-side, free floating reciprocable segments 21 and 22, respectively. Each segment may have a serrated work-engaging surface, and is adapted to move rearwardly relative to its respective jaw into its respective chamber 23 or 24. Referring now to Fig. 7, the chamber 23 of the right-hand or stationary jaw 10 comprises a bottom wall 25, side walls 26 and 27, a removable cover plate 28, and a removable end plate 30. A similar chamber 24, constructed in like manner, forms a part of the movable jaw 11. The reciprocable segments of each jaw are mounted for rectilinear sliding movement on a bed 6a of their respective jaw (see Fig. 4) and are separated (see Fig. 7) by thin spacers 31. As shown in Fig. 4 and by dotted lines in the left-hand jaw of Fig. 1, the cover plates 28 are each formed with a transverse slot 28a into which vertical fins 31a on the top edges of the spacers 31 project, serving to hold the spacers against movement when the jaw segments are reciprocated. Each of the chambers 23 and 24 is filled with small steel balls of a size approximately 3/64" in diameter. A sufficient number of steel balls to load each chamber to approximately 7/8 of its capacity are placed in the chambers 23 and 24 before the cover plate 28 for each of the jaws 10 and 11 is attached and secured by socket screws 32.

The initial alignment of the segments 21 and 22 is effected by cylindrical cams 33 and 34. The cams extend transversely of their respective jaws 10 and 11, being disposed beneath the segment group which they control, and are pivotally mounted at their opposite ends in the side walls of the jaws. Levers 37 and 38 are fixed to the cams 33 and 34, respectively, to rock the cams for aligning the jaw segments. Each of the cams 33 and 34 is formed with a high point 39 for cooperation with the segments, in all of which there is provided a recess 40 formed by a vertical front wall 41 and a sloping rear wall 42. A fixed plate 43, formed with a transverse shoulder 44, is provided in each jaw 10 and 11 to limit the rearward movement of the jaw segments. The segments 21 and 22 of each jaw in turn, are formed each with a shoulder 45 which abuts the shoulder 44 of the respective stop plate to limit the rearward movement of the segment.

*Operation*

The operation of the improved vise is as follows:

Assuming a work-piece 50 of given size and shape is to be clamped in the vise, the operator opens the gap between the jaws of the vise by means of the handwheel 20 and the screw drive so that the gap is somewhat larger than the object to be clamped. The levers 37 and 38 are then swung towards each other to rock the cams 33 and 34, the high points 39 of which bear against the front walls 41 of the recesses 40 in the jaw segments and force the segments into alignment, as shown in Fig. 1. The operator then rotates the screw shaft clockwise by means of the handwheel 20 to move the jaw 11 toward the fixed jaw 10. As the free floating segments of the jaws engage the object 50, they "feel out" its contour. In the particular example shown in Fig. 7, six of the segments engage the cylindrical portion of the work-piece, four segments contact the restricted neck portion, the tapered portion has six segments contacting its surface, and a single pair of jaw segments engage the slender terminal portion of the work-piece. As the operator continues to turn the handwheel 20, the rear ends of the free-floating segments move to the positions in the chamber shown in Fig. 7, displacing the steel balls wherever a jaw segment is urged rearward into the chamber and causing them to flow to those areas where the segments have not been urged rearwardly. In effect, the contour of the object to which the segments have been applied, has been transferred to the chamber, but in reverse, displacing the contents of the chamber in order to equalize the thrusts which have been set up through pressure of the screw shaft until a rigid pressure is exerted upon the work-piece 50, when further displacement of the steel balls is no longer possible. As a consequence, there has been effected a reduction in the cubical volume of the chambers due to the closing movement of the jaws (or rearward movement of the segments) and therefore the steel balls now fill the chambers completely, whereas in the open position of the vise jaws, the chambers normally are filled to 7/8 of their capacity only. Final tightening is accomplished by turning the handwheel so that the total pressure created by the screw will be transmitted through the segments to grip the various surface areas of the work-piece. It will be noted that by the utilization of a screw drive, the movable jaw will remain in any set position. To remove the work-piece 50 from the vise jaws, the operator merely turns the hand wheel in the reverse (or counterclockwise) direction and the work-piece can be removed. If operating on successive work-pieces of the same contour they can readily be placed in position and tightened, the jaw segments remaining in their set positions, since it is not necessary to realign them after each operation.

In actual practice, tests have shown that no matter what the shape or size, within the limits of the jaw opening, work-pieces may be clamped in any desired position. Inasmuch as the improved vise is adaptable for holding an infinite variety of shapes and sizes of work-pieces, it will be found to have a broad application in varied mechanical fields and industries. Not only will it be found exceptionally useful as a bench vise, but it will be found to be of value in the set-up and alignment of work-pieces in shaping and milling machines. Due to the rugged construction of the vise it can be used for holding rough castings on a milling machine table. In its wider range of usefulness, it is especially valuable as a drill press vise. There is a deep clearance beneath the jaws of the vise permitting various types of drilling operations through the work. Mating parts matched together in the vise can be located and held so that work can be done on both parts simultaneously.

Having thus described my invention, what I claim is:

1. A clamping device comprising a pair of opposed jaws, one jaw being fixed and the other jaw being movable toward and away from the fixed jaw, threaded means operable to effect the movement of said movable jaw and hold it positively in any set position, at least one jaw being equipped with a clamping face comprising a plurality of free-floating reciprocable segments shiftable relative to one another according to the contour of a work-piece located between the jaws, thin stationary spacing elements arranged between adjacent segments, a chamber in which the jaw segments reciprocate, the rear ends of said segments constituting the forward wall of said chamber, displaceable means normally partially filling said chamber, said means flowing freely throughout said chamber as one or more segments move rearwardly into said chamber until further displacement is terminated by the diminution of the volume of the chamber due to the rearward movement of the segment or segments, the displaceable means then holding all the segments in their set position with the work piece firmly clamped between them, each of said segments having a recess in its bottom surface, said recesses being equidistant from a common end of the segments, and a cam common to all the segments being positioned in said recesses and having an axially extending recess which provides for the relative shifting of the segments, said cam being operable to align the clamping faces of the segments.

2. A clamping device according to claim 1, wherein the segments remain in the position to which they are relatively shifted according to the contour of the work-piece when the jaws are relaxed and the work piece removed.

3. A clamping device according to claim 1, wherein both the fixed and movable jaws are equipped with free-floating reciprocable clamping segments.

4. A clamping device according to claim 1, wherein both jaws are equipped with free-floating reciprocable segments, and including means for limiting their rearward reciprocating movement.

NATHAN BAROWSKY.

References Cited in the file of this patent

UNITED STATES PATENTS

| Number | Name | Date |
|---|---|---|
| 1,256,217 | Fieldhouse | Feb. 12, 1918 |
| 1,499,989 | Lehmann | July 1, 1924 |
| 1,715,659 | Joksch | June 4, 1929 |

FOREIGN PATENTS

| Number | Country | Date |
|---|---|---|
| 243,889 | Switzerland | Mar. 17, 1947 |

OTHER REFERENCES

Publication, "Machinery," June 1938, page 684.